US012676577B2

(12) United States Patent
Xu

(10) Patent No.: US 12,676,577 B2
(45) Date of Patent: Jul. 7, 2026

(54) NON-CONTACT ELECTROLUMINESCENCE DEFECT DETECTION METHOD

(71) Applicant: JIANGSU SAMBON TECHNOLOGY CO., LTD., Suzhou (CN)

(72) Inventor: Zijing Xu, Suzhou (CN)

( * ) Notice: Subject to any disclaimer, the term of this patent is extended or adjusted under 35 U.S.C. 154(b) by 0 days.

(21) Appl. No.: 19/330,951

(22) Filed: Sep. 17, 2025

(65) Prior Publication Data

US 2026/0163523 A1 Jun. 11, 2026

(51) Int. Cl.
*H02S 50/15* (2014.01)
*G01N 21/88* (2006.01)

(52) U.S. Cl.
CPC ......... *H02S 50/15* (2014.12); *G01N 21/8851* (2013.01); *G01N 2021/8864* (2013.01); *G01N 2021/8887* (2013.01)

(58) Field of Classification Search
CPC ............... H02S 50/15; G01N 21/8851; G01N 2021/8864; G01N 2021/8887
See application file for complete search history.

(56) References Cited

U.S. PATENT DOCUMENTS 9,685,906 B2 * 6/2017 Lagowski ............... H02S 50/15
10,199,985 B2 2/2019 Zimmermann et al.

12,372,469 B2 7/2025 Jung et al.
2009/0206287 A1 * 8/2009 Trupke .................... G01N 21/64
250/582
2012/0181452 A1 * 7/2012 Trupke ............... G01N 21/6489
250/214 R
2015/0070487 A1 3/2015 Agbuga
2018/0159468 A1 * 6/2018 Trupke .................... G01N 33/00
2018/0159469 A1 * 6/2018 Trupke .................... H02S 50/15

* cited by examiner

*Primary Examiner* — Tarifur R Chowdhury
*Assistant Examiner* — Joshua M Carlson
(74) *Attorney, Agent, or Firm* — Sam Pierce

(57) ABSTRACT

A non-contact electroluminescence defect detection method, including: acquiring a center photoluminescence image, left and right electroluminescence images of a moving solar cell. Performing a fusion processing on the images to identify overlapping boundary regions, and determining a boundary distortion, and then locating initial defect position coordinates. Measuring left and right diffusion distances using images to generate a diffusion asymmetry degree, and determining a defect shift direction to generate accurate defect position coordinates. Extracting a center luminescence intensity and an edge luminescence intensity from the images, and forming a luminescence gradient curve based on the intensities to identify intensity jumping points. Adopting the intensity jumping points as dividing points to segment and establishing an energy distribution index, to identify energy conversion defects. Finally, a spatial positioning map containing defect location, type, and influence range is generated, enabling non-destructive detection and precise localization of various defect types in solar cell.

9 Claims, 7 Drawing Sheets

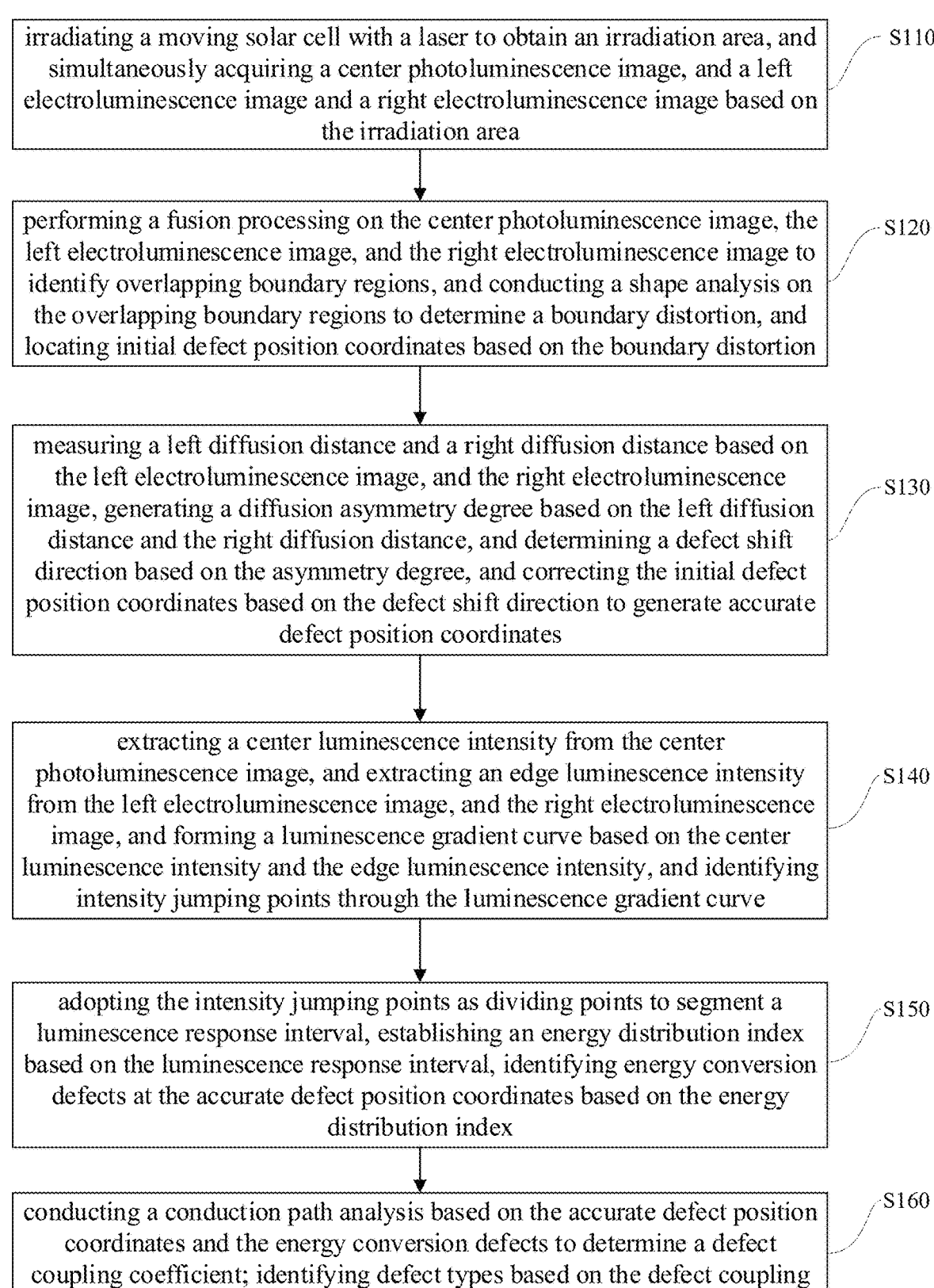

irradiating a moving solar cell with a laser to obtain an irradiation area, and simultaneously acquiring a center photoluminescence image, and a left electroluminescence image and a right electroluminescence image based on the irradiation area          S110 performing a fusion processing on the center photoluminescence image, the left electroluminescence image, and the right electroluminescence image to identify overlapping boundary regions, and conducting a shape analysis on the overlapping boundary regions to determine a boundary distortion, and locating initial defect position coordinates based on the boundary distortion          S120 measuring a left diffusion distance and a right diffusion distance based on the left electroluminescence image, and the right electroluminescence image, generating a diffusion asymmetry degree based on the left diffusion distance and the right diffusion distance, and determining a defect shift direction based on the asymmetry degree, and correcting the initial defect position coordinates based on the defect shift direction to generate accurate defect position coordinates          S130 extracting a center luminescence intensity from the center photoluminescence image, and extracting an edge luminescence intensity from the left electroluminescence image, and the right electroluminescence image, and forming a luminescence gradient curve based on the center luminescence intensity and the edge luminescence intensity, and identifying intensity jumping points through the luminescence gradient curve          S140 adopting the intensity jumping points as dividing points to segment a luminescence response interval, establishing an energy distribution index based on the luminescence response interval, identifying energy conversion defects at the accurate defect position coordinates based on the energy distribution index          S150 conducting a conduction path analysis based on the accurate defect position coordinates and the energy conversion defects to determine a defect coupling coefficient; identifying defect types based on the defect coupling coefficient, and outputting a spatial positioning map based on the defect types, completing the non-contact electroluminescence defect detection          S160

FIG. 1

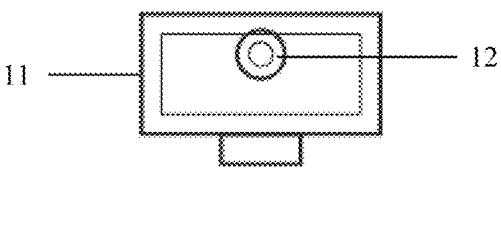
FIG. 2
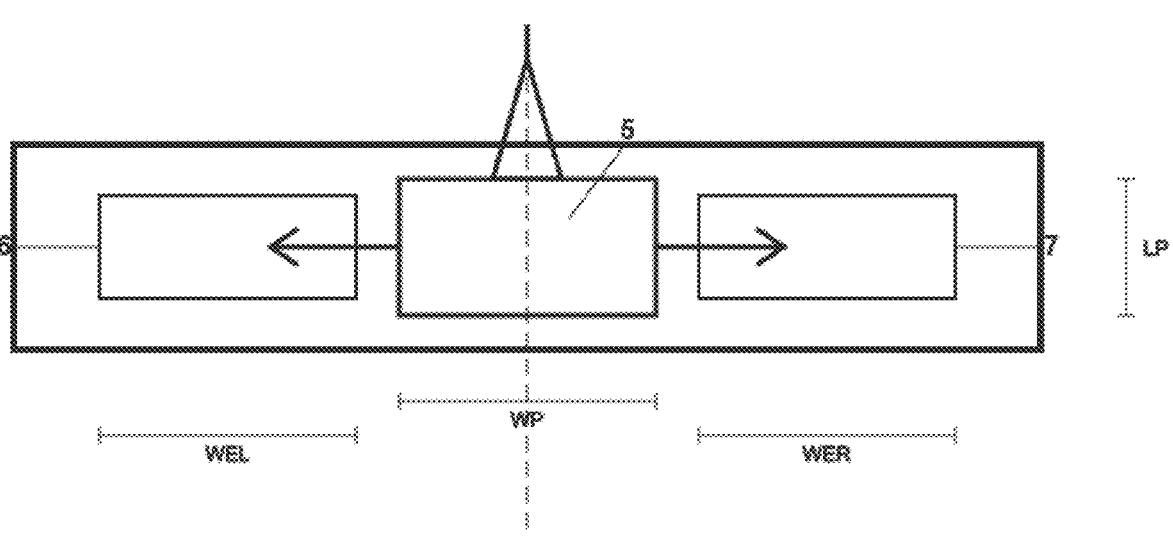
FIG. 3

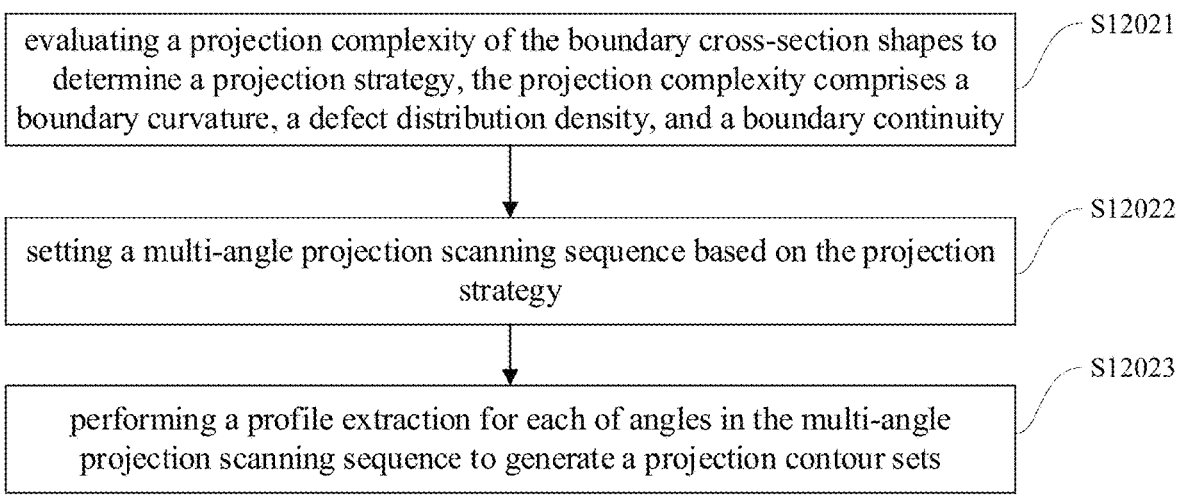

evaluating a projection complexity of the boundary cross-section shapes to determine a projection strategy, the projection complexity comprises a boundary curvature, a defect distribution density, and a boundary continuity    S12021 setting a multi-angle projection scanning sequence based on the projection strategy    S12022 performing a profile extraction for each of angles in the multi-angle projection scanning sequence to generate a projection contour sets    S12023

FIG. 6 forming diffusion trajectories based on the left diffusion distance and the right diffusion distance    S1301 identifying diffusion acceleration segments and diffusion deceleration segments from the diffusion trajectories    S1302 conducting a duration comparison analysis on the diffusion acceleration segments and the diffusion deceleration segments to generate a duration difference value    S1303 generating the diffusion asymmetry degree based on the duration difference value    S1304

FIG. 7

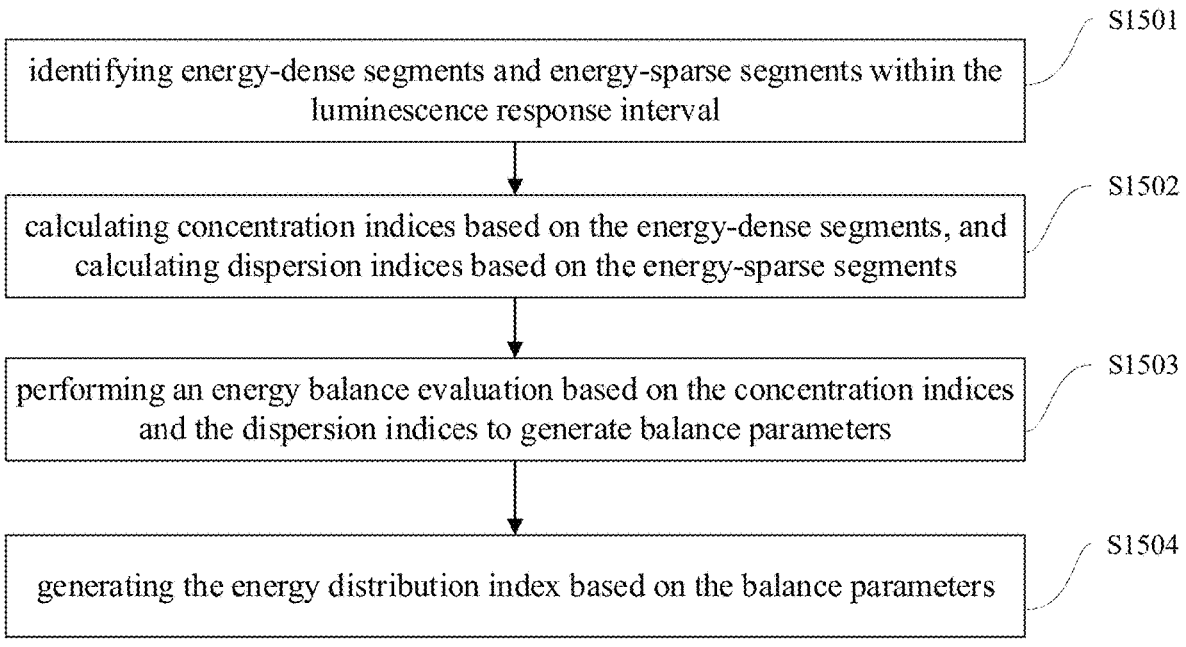

S1501 identifying energy-dense segments and energy-sparse segments within the luminescence response interval

S1502 calculating concentration indices based on the energy-dense segments, and calculating dispersion indices based on the energy-sparse segments

S1503 performing an energy balance evaluation based on the concentration indices and the dispersion indices to generate balance parameters

S1504 generating the energy distribution index based on the balance parameters

FIG. 10

S1601 establishing defect impact boundaries based on the accurate defect position coordinates

S1602 tracking a conduction path of the energy conversion defects within the defect influence boundaries, to identify a conduction enhancement path and a conduction attenuation path

S1603 determining the defect coupling coefficient based on a length ratio of the conduction enhancement path and the conduction attenuation path

NON-CONTACT ELECTROLUMINESCENCE DEFECT DETECTION METHOD

TECHNICAL FIELD

The present disclosure relates to technology field of solar cell detection, particularly to a non-contact electroluminescence defect detection method.

BACKGROUND

As the core component of photovoltaic power generation systems, the internal defects of solar cells directly affect the photoelectric conversion efficiency and service life. Existing defect detection methods often rely on contact-based measurements or single imaging techniques, which have limitations in detection accuracy, inability to precisely locate defect positions, and the risk of damaging the surface of the solar cells during the detection process. Especially in identifying complex defects such as carrier transport defects and energy conversion anomalies, traditional methods often struggle to provide accurate defect type classification and spatial location information.

With the rapid development of solar cell technology and the increasing demands for quality, there is an urgent need to develop a high-precision, non-destructive defect detection technology. This technology should be capable of achieving accurate identification and localization of various types of defects without contacting the cell surface, while also providing detailed defect characteristic analysis and spatial distribution information. This would provide reliable technical support for solar cell quality assessment and process optimization.

SUMMARY

The disclosure provides a non-contact electroluminescence defect detection method and system, which aims to generate multi-modal electroluminescence imaging through laser irradiation, and integrate image processing and carrier diffusion analysis techniques, to precisely identify and locate boundary distortions, carrier transport anomalies, energy conversion defects, and other issues in solar cells. The specific defect types are then determined through defect coupling coefficient analysis, ultimately forming a complete spatial spatial positioning map that provides accurate defect information for solar cell quality detection, defect analysis, and other application scenarios.

To realize the above objective, the present disclosure provides a non-contact electroluminescence defect detection method, including:

irradiating a moving solar cell with a laser to obtain an irradiation area, and simultaneously acquiring a center photoluminescence image, and a left electroluminescence image and a right electroluminescence image based on the irradiation area; and performing a fusion processing on the center photoluminescence image, the left electroluminescence image, and the right electroluminescence image to identify overlapping boundary regions, and conducting a shape analysis on the overlapping boundary regions to determine a boundary distortion, and locating initial defect position coordinates based on the boundary distortion; and measuring a left diffusion distance and a right diffusion distance based on the electroluminescence left image, and the right electroluminescence image, generating a diffusion asymmetry degree based on the left diffusion distance and the right diffusion distance, and determining a defect shift direction based on the asymmetry degree, and correcting the initial defect position coordinates based on the defect shift direction to generate accurate defect position coordinates; and extracting a center luminescence intensity from the center photoluminescence image, and extracting an edge luminescence intensity from the left electroluminescence image, and the right electroluminescence image, and forming a luminescence gradient curve based on the center luminescence intensity and the edge luminescence intensity, and identifying intensity jumping points through the luminescence gradient curve; and adopting the intensity jumping points as dividing points to segment a luminescence response interval, establishing an energy distribution index based on the luminescence response interval, identifying energy conversion defects at the accurate defect position coordinates based on the energy distribution index; and conducting a conduction path analysis based on the accurate defect position coordinates and the energy conversion defects to determine a defect coupling coefficient; identifying defect types based on the defect coupling coefficient, and outputting a spatial positioning map based on the defect types, completing the non-contact electroluminescence defect detection.

Furthermore, acquiring center photoluminescence image and left electroluminescence image, and the right electroluminescence image based on the irradiation area includes: establishing a light signal timestamp mapping relationship within the irradiation area; collecting complementary signals of center photoluminescence singles, and the left and right electroluminescence signals based on the timestamp mapping relationship to generate complementary signal pairs; performing spatiotemporal cross validation on the complementary signal pairs to form a verification matrix; forming the center photoluminescence image based on the verification matrix, and the left electroluminescence image, and the right electroluminescence image.

Furthermore, performing a fusion processing on e center photoluminescence image, the left electroluminescence image, and the right electroluminescence image to identify overlapping boundary regions includes: extracting boundary cross-section shapes from the center photoluminescence image, the left electroluminescence image, and the right electroluminescence image; performing a multi-angle projection analysis based on the boundary cross-section shapes to generate projection contour sets; performing a cross-overlay processing on the projection contour sets to form an overlay map; identifying boundary overlap regions based on the overlay map.

Furthermore, generating a diffusion asymmetry degree based on the left diffusion distance and the right diffusion distance includes: forming diffusion trajectories based on the left diffusion distance and the right diffusion distance; identifying diffusion acceleration segments and diffusion deceleration segments from the diffusion trajectories; conducting a duration comparison analysis on the diffusion acceleration segments and the diffusion deceleration segments to generate a duration difference value; generating the diffusion asymmetry degree based on the duration difference value.

Furthermore, forming a luminescence gradient curve based on the center luminescence intensity and the edge luminescence intensity includes: establishing an intensity difference sequence based on the center luminescence intensity and the edge luminescence intensity; performing a gradient stratification on the intensity difference sequence to generate steep gradient layers, gradual gradient layers, and gentle gradient layers; extracting mutation features from the steep gradient layers, and extracting transition features from the gradual gradient layers, and extracting steady-state features from the gentle gradient layers; modulating and reconstructing the mutation features, the transition features, and the steady-state features to generate the luminescence gradient curve.

Furthermore, establishing an energy distribution index based on the luminescence response interval includes: identifying energy-dense segments and energy-sparse segments within the luminescence response interval; calculating concentration indices based on the energy-dense segments, and calculating dispersion indices based on the energy-sparse segments; performing an energy balance evaluation based on the concentration indices and the dispersion indices to generate balance parameters; generating the energy distribution index based on the balance parameters.

Furthermore, conducting a conduction path analysis based on the accurate defect position coordinates and the energy conversion defects to determine a defect coupling coefficient includes: establishing defect impact boundaries based on the accurate defect position coordinates; tracking a conduction path of the energy conversion defects within the defect influence boundaries, to identify a conduction enhancement path and a conduction attenuation path; determining the defect coupling coefficient based on a length ratio the conduction enhancement path and the conduction attenuation path.

Furthermore, performing a multi-angle projection analysis based on the boundary cross-section shapes to generate a projection contour sets includes: evaluating a projection complexity of the boundary cross-section shapes to determine a projection strategy, the projection complexity includes a boundary curvature, a defect distribution density, and a boundary continuity; setting a multi-angle projection scanning sequence based on the projection strategy; performing a profile extraction for each of angles in the multi-angle projection scanning sequence to generate a projection contour sets.

Furthermore, modulating and reconstructing the mutation features, the transition features, and the steady-state features to generate the luminescence gradient curve includes: conducting polarity identification on the mutation features, the transition features, and the steady-state features to generate a positive polarity feature group and a negative polarity feature group; neutralizing the negative polarity feature group based on the positive polarity feature group to form balanced features; modulating and encoding the balanced features to generate a feature modulation signal; demodulating and reconstructing the feature modulation signal to generate the luminescence gradient curve.

The beneficial effects of the present disclosure are reflected in the following aspects.

By using laser irradiation to acquire multi-modal imaging of the center photoluminescence, and left and right electroluminescence images, combined with boundary section shape extraction and multi-angle projection analysis, to accurately identify the boundary overlap area and perform shape analysis. This effectively captures boundary distortion features and achieves precise localization of the initial defect positions, solving the technical problem of single imaging modes being unable to comprehensively capture defect information.

A defect position correction system based on the physical mechanism of carrier diffusion is established. By measuring the left and right diffusion distances and calculating the diffusion asymmetry, the direction of defect offset can be accurately determined, thereby precisely correcting the initial defect position coordinates. This carrier transport-based correction method improves the accuracy of defect localization and effectively eliminates system errors in the image processing process.

By identifying intensity jumping points that reflect carrier concentration mutation locations, the luminescence response interval is divided, and energy distribution characteristics are analyzed. Concentration and dispersion indicators are established to quantify energy conversion efficiency and uniformity. Through conduction path analysis, the disclosure distinguishes between enhancement paths and attenuation paths, calculating defect coupling coefficients to quantify the impact of defects on carrier transport. This achieves accurate classification and identification of different defect mechanisms, as such carrier generation, transport, recombination, and collection, thus solving the problem in traditional methods that cannot distinguish defect types.

It should be understood that the general description above, along with the detailed description in the following text, is exemplary and explanatory in nature and does not limit the scope of this disclosure.

BRIEF DESCRIPTION OF THE DRAWINGS

The accompanying drawings illustrate specific examples of the technical solutions of the present disclosure and form part of the description, used to explain the technical solutions, principles, and effects of the disclosure.

Unless otherwise stated, the same reference numerals in different drawings represent the same or similar technical features. For the same or similar technical features, different reference numerals may also be used.

FIG. 1 is a flowchart of a non-contact electroluminescence defect detection method according to an embodiment of the present disclosure.

FIG. 2 is a structural diagram of a non-contact electroluminescence defect detection system according to an embodiment of the present disclosure.

FIG. 3 is a schematic diagram of an irradiation area principle of the present disclosure.

FIG. 6 is a third detailed flowchart of the non-contact electroluminescence defect detection method according to an embodiment of the present disclosure.

FIG. 7 is a fourth detailed flowchart of the non-contact electroluminescence defect detection method according to an embodiment of the present disclosure.

FIG. 10 is a seventh detailed flowchart of the non-contact electroluminescence defect detection method according to an embodiment of the present disclosure.

FIG. 11 is a eighth detailed flowchart of the non-contact electroluminescence defect detection method according to an embodiment of the present disclosure

Figures 4, 5:
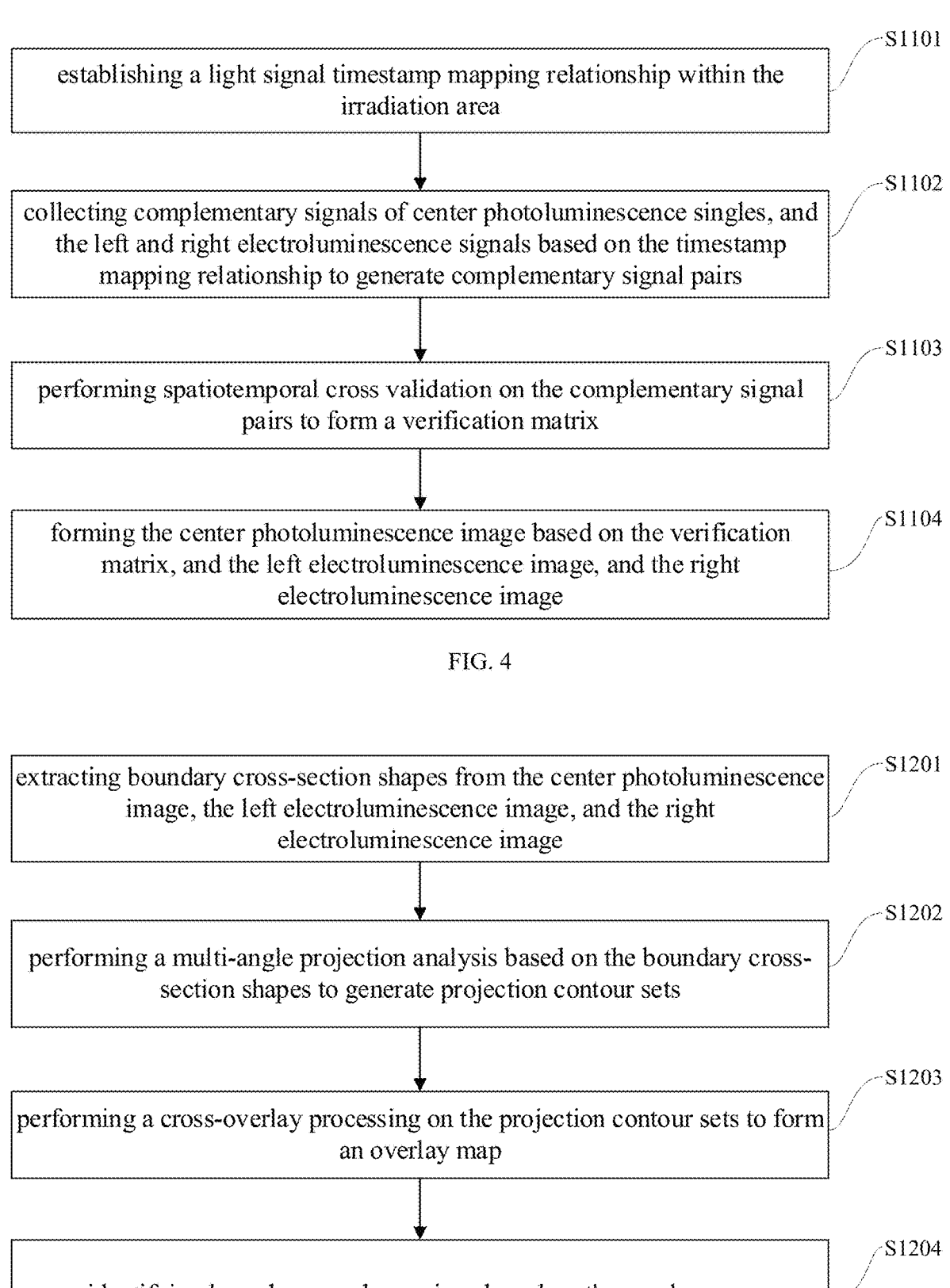
FIG. 4 is a first detailed flowchart of the non-contact electroluminescence defect detection method according to an embodiment of the present disclosure.
FIG. 5 is a second detailed flowchart of the non-contact electroluminescence defect detection method according to an embodiment of the present disclosure.

DESCRIPTION OF THE REFERENCE NUMERALS 11 high-resolution industrial camera, 12 line laser light source, 2 solar cell, 3 left rail, 4 right rail, 5 regular center irradiation area, 6 left electroluminescence area, 7 right electroluminescence area.

DETAILED DESCRIPTION OF THE EMBODIMENTS

The following description provides specific details such as particular system structures and technologies for illustrative purposes rather than limiting the scope, to facilitate a thorough understanding of the embodiments of this disclosure. However, those skilled in the art will recognize that this disclosure can also be implemented in other embodiments without these specific details. In other cases, detailed descriptions of well-known systems, circuits, and methods are omitted to avoid unnecessary details that may hinder the description of this disclosure.

It should be understood that when the term "include" is used in the description and claims of this disclosure, it indicates the presence of the described features, components, steps, operations, elements, and/or assemblies, but does not exclude the presence or addition of one or more other features, components, steps, operations, elements, and/or assemblies.

It should also be understood that the term "and/or" used in the description and claims of this disclosure refers to any combination of one or more of the listed items and all possible combinations, and includes these combinations.

The technical solutions of the embodiments of this disclosure are described below.

As shown in FIG. 1, an embodiment of the present disclosure provides a non-contact electroluminescence defect detection method, including the following steps of S110 to S160.

S110, irradiating a moving solar cell with a laser to obtain an irradiation area, and simultaneously acquiring a center photoluminescence image, and a left electroluminescence image and a right electroluminescence image based on the irradiation area.

Specifically, as shown in FIG. 2, the solar cell 2 is placed on a left rail 3 and a right rail 4 and moves uniformly from left to right along the left rail 3 and the right rail 4. A line laser light source 12 and a high-resolution industrial camera 11 are installed above the solar cell 2. The line laser light source 12 continuously emits a laser beam at a specific period, which irradiates a surface of the solar cell 2 on the left rail 3 and the right rail 4. The energy contained in the laser beam strikes the solar cell 2, exciting electrons from a ground state to an excited state, generating electron-hole pairs, which are charge carriers. As shown in FIG. 3, the laser irradiation on the surface of the solar cell forms a regular central irradiation area 5, which has determined geometric parameters: width (W) and length (L), where W is the width of the central irradiation area 5 and L is the length of the central irradiation area 5. Excitation energy within the central irradiation area 5 is divided into two transmission paths: one portion of the excitation energy radiates directly out of the central irradiation area 5 in a form of stimulated emission, generating photoluminescence, which is captured by the high-resolution industrial camera 11 located above the solar cell; the other portion of the excitation energy is converted into induced current, which is laterally transmitted to the left and right sides from the center of the central irradiation area 5, forming left electroluminescence region 6 and right electroluminescence region 7, and generating electroluminescence phenomena during the transmission process, which is also captured by the high-resolution industrial camera 11. As the left rail 3 and the right rail 4 continue to move, the solar cell 2 undergoes the above physical process repeatedly, completing laser irradiation and carrier excitation of the entire solar cell from left to right, finally establishing an irradiation area containing both photoluminescence mechanism and electroluminescence mechanism.

As shown in FIG. 4, a part of S110, acquiring center photoluminescence image and left electroluminescence image, and the right electroluminescence image based on the irradiation area includes the follow steps of S1101-S1104.

S1101, establishing a light signal timestamp mapping relationship within the irradiation area.

S1102, collecting complementary signals of center photoluminescence single, left electroluminescence signal, and right electroluminescence signal based on the timestamp mapping relationship to generate complementary signal pairs.

S1103, performing spatiotemporal cross validation on the complementary signal pairs to form a verification matrix.

S1104, forming the center photoluminescence image based on the verification matrix, and the left electroluminescence image, and the right electroluminescence image.

Specifically, S1101, establishing a light signal timestamp mapping relationship for the irradiation area. The stimulated emission generated in the central irradiation area 5 directly radiates out from this area, forming a central photoluminescence signal Pt, with the center photoluminescence recorded as I_PL(t). Meanwhile, the central irradiation area 5 generates induced current due to light exposure, and the induced current is laterally transmitted to the left and right sides from the center of the central irradiation area 5. In the left electroluminescence region 6, the induced current is transmitted to the left from the central irradiation area 5, forming an induced current region with width, recorded as WEL, and length, recorded as LE, and generating an electroluminescence phenomenon, with the left electroluminescence signal recorded as I_EL_left(t). In the right electroluminescence region 7, the induced current is transmitted to the right, forming an induced current region with width, recorded as WER, and length, recorded as LE, and generating an electroluminescence phenomenon, with the right electroluminescence signal recorded as I_EL_right(t). The imaging of the three regions is recorded as Pt (center photoluminescence image, in the central irradiation area 5), ELt (left electroluminescence image, in the left electroluminescence region 6), and ERt (right electroluminescence image, in the right electroluminescence region 7), where t represents a data collection period. The light signal timestamp mapping relationship T_map adopts a matrix structure to simultaneously record timestamps and corresponding signal intensities: T_map (i, j, 1) records the timestamp of an i-th region at an j-th moment, and T_map (i, j, 2) records the corresponding signal intensity value. The spatial coordinates and time correlation are established through a movement speed of the solar cell, with a spatial coordinate x and time t mapped by x(t)=v×t, where v is a uniform speed of the right rail and the left rail, realizing an accurate correspondence between spatial and temporal coordinates.

S1102, collecting complementary signals of center photoluminescence single, and the left right electroluminescence and right electroluminescence signal based on the timestamp mapping relationship to generate complementary signal pairs. The signal intensity information for the three channels is extracted from the T_map matrix: the central photoluminescence signal intensity I_PL=T_map(1, j, 2), the left electroluminescence signal intensity I_EL_left=T_map(2, j, 2), and the right electroluminescence signal intensity I_EL_right=T_map(3, j, 2). The central photoluminescence signal and the left and right electroluminescence signals have complementary characteristics in the time dimension: photoluminescence signals respond quickly but have relatively short durations, while electroluminescence signals have transmission delays but longer durations, forming an effective complementary coverage on the time axis. Complementary acquisition is performed using time-division multiplexing and signal fusion, with different signal combinations being focused on at different time periods. Complementary signal pairs are generated through a weighted fusion algorithm, to obtain the following complementary signal pairs.

A left complementary signal pair, $$Pair\_left = \alpha\_left \times I\_PL + \beta\_left \times I\_EL\_left.$$

A right complementary signal pair, $$Pair\_right = \alpha\_right \times I\_PL + \beta\_right \times I\_EL\_right.$$

Where, $\alpha\_left$, $\beta\_left$, $\alpha\_right$ and $\beta\_right$ are weight coefficients. Each of the weight coefficients is adjusted based on the signal intensity and region size.

Where, $$\alpha\_left = I\_PL/(I\_PL + I\_EL\_left) \times WP/(WP + WEL), \text{ and}$$

$$\beta\_left = I\_EL\_left/(I\_PL + I\_EL\_left) \times WEL/(WP + WEL).$$

The right-side weight coefficients ($\alpha\_right$ and $\beta\_right$) are calculated similarly.

S1103, performing spatiotemporal cross validation on the complementary signal pairs to form a verification matrix. The complementary signal pairs are subjected to spatiotemporal cross validation to form the verification matrix. The complementary signal pair data set includes two sets of data: the left complementary signal pair (Pair_left) and the right complementary signal pair (Pair_right), each containing intensity values for the time series and corresponding time-stamp information. The spatiotemporal cross validation adopts a region-based analysis strategy, dividing the irradiation area, the left electroluminescence region, and the right electroluminescence region into multiple sub-regions, each corresponding to a specific spatial location and time window. For each of the multiple sub-regions, the corresponding intensity values are extracted from the complementary signal pair for verification analysis. Intensity consistency verification compares the signal intensity variation at the same spatial location at different times by calculating the relative error to assess data reliability. According the temporal continuity verification to verify and analyze the intensity variation trend at adjacent time points in the complementary signal pair, checking a smoothness and physical rationality of the signal change. Spatial continuity verification compares the complementary signal pair values of adjacent sub-regions to validate the continuity of the signal in spatial distribution. A three-dimensional structure is used to store the verification results, that is, the verification matrix. The three-dimensional structure is recorded as V_matrix(i, j, k), which represents a verification matrix for an i-th spatial sub-region, a j-th time window, and a k-th verification index, where k=1 represents intensity consistency verification, k=2 represents temporal continuity verification, and k=3 represents spatial continuity verification.

S1104, forming the center photoluminescence image based on the verification matrix, and the left electroluminescence image, and the right electroluminescence image. The verification matrix is used to generate the central photoluminescence image, the left electroluminescence image, and the right electroluminescence image. Pixel-level weighted processing is carried out based on a quality score V_matrix(i, j, k) for each spatial location in the verification matrix, with high-quality score data points being prioritized, and low-quality data being interpolated. Reconstructing the central photoluminescence image to extract quality assessment information related to the central region from the verification matrix, and combines the original photoluminescence signal intensity data to calculate pixel intensity values: $P\_PL(x,y)=I\_PL(x,y) \times \Sigma(V\_matrix(i,j,k))/3$, where $P\_PL(x,y)$ represents pixel intensity value on the position of (x, y). Reconstructing the left electroluminescence image and the right electroluminescence image respectively, to extract quality assessment information related to the left and right regions from the verification matrix, combining the corresponding electroluminescence signal intensity data to generate the left electroluminescence image and the right electroluminescence image, where the left pixel values being computed: $P\_EL\_left(x,y)=I\_EL\_left(x,y) \times \Sigma(V\_matrix(i, j, k))/3$ where, $P\_EL\_left(x,y)$ represents the left pixel values. The right pixel values being similarly computed. Image quality is quantified using the signal-to-noise ratio (SNR), to obtain: $SNR=20 \times \log 10 (I\_signal/I\_noise)$. where I_signal is an effective signal intensity and I_noise is a noise intensity. Image post-processing includes geometric correction to eliminate distortion introduced by the optical system, and intensity calibration to establish a linear relationship between image grayscale values and actual emission intensity, ultimately resulting in high-fidelity images containing both photoluminescence and electroluminescence information.

S120, performing a fusion processing on the center photoluminescence image, the left electroluminescence image, and the right electroluminescence image to identify overlapping boundary regions, and conducting a shape analysis on the overlapping boundary regions to determine a boundary distortion, and locating initial defect position coordinates based on the boundary distortion.

As shown in FIG. 5, a part of S120, performing a fusion processing on the center photoluminescence image, the left electroluminescence image, and the right electroluminescence image to identify overlapping boundary regions includes the following steps of S1201-S1204.

S1201, extracting boundary cross-section shapes from the center photoluminescence image, the left electroluminescence image, and the right electroluminescence image.

S1202, performing a multi-angle projection analysis based on the boundary cross-section shapes to generate projection contour sets.

S1203, performing a cross-overlay processing on the projection contour sets to form an overlay map.

S1204, identifying boundary overlap regions based on the overlay map.

Specifically, S1201, extracting the boundary cross-section shapes from the central photoluminescence image, the left electroluminescence image, and the right electroluminescence image. An intensity threshold segmentation method is adopted, with the threshold set to 30% of the image's maximum intensity, and pixel regions above the threshold constitute the effective light-emitting area. The threshold adaptive adjustment mechanism is based on the bimodal features of the image histogram, and the segmentation threshold is dynamically optimized through the Otsu method. The boundary cross-section shape in the central photoluminescence image appears as a rectangular contour, with a width of about 2 mm, high boundary sharpness, and geometric regularity. The boundary cross-section shape in the left electroluminescence image presents an irregular shape due to the non-uniformity of lateral current diffusion, with serrated and wavy features along the boundary, and the cross-section width gradually attenuates from 8 mm at the inner side. The boundary cross-section shape in the right electroluminescence image is similar but mirror-symmetric to the left side. The cross-section shape is parameterized using curve fitting. Straight segments are represented by two point coordinates, curved segments are represented by cubic spline functions, and irregular segments are represented by discrete point sequences. The geometric features of the boundary cross-section include quantitative parameters such as cross-section length, cross-section width, and boundary curvature.

S1202, performing the multi-angle projection analysis based on the boundary cross-section shape to generate projection contours set includes the following step of S12021-S12023.

S12021, evaluating a projection complexity of the boundary cross-section shapes to determine a projection strategy, the projection complexity includes a boundary curvature, a defect distribution density, and a boundary continuity.

S12022, setting a multi-angle projection scanning sequence based on the projection strategy.

S12023, performing a profile extraction for each of angles in the multi-angle projection scanning sequence to generate the projection contour sets.

Firstly, the projection complexity is evaluated based on the boundary cross-sectional shapes, to determine the projection strategy. The boundary curvature is calculated through statistical analysis of a curvature radius, the defect distribution density is obtained via spatial frequency analysis, and the boundary continuity is assessed through divergence analysis of a gradient vector field. The overall projection complexity considers these three factors, the boundary curvature, the defect distribution density, and the boundary continuity, and is calculated using a weighted method.

Based on a value of the projection complexity, the projection strategy is as following: low complexity adopts a coarse sampling, an angular interval of 15°; and medium complexity adopts a standard sampling, the angular interval of 5°; and high complexity adopts a fine sampling, the angular interval of 1°.

Next, the multi-angle projection scanning sequence is established according to the projection strategy. An evenly spaced angle sequence is generated based on the angular interval parameter, incrementally increasing from 0° to nearly 180°. Specifically, a coarse sampling yields 13 scanning angles, a standard sampling yields 37 angles, and a fine sampling yields 181 angles. Each of the scanning angles corresponds to a projection direction, and a direction vector is computed using trigonometric functions of the angle. A projection distance range is determined based on image dimensions, with the image diagonal length used as a maximum projection distance.

Then, performing a profile extraction for each of angles in the multi-angle projection scanning sequence to generate projection contour sets. This is achieved using a radon transform, where for each of the scanning angles, a one-dimensional projection contour is computed. The projection is performed by line integration along the projection direction: $P(\theta,\rho)=\iint f(x,y)\delta(x\cos\theta+y\sin\theta-\rho)\,dxdy$, where, $P(\theta,\rho)$ is the projection, $\theta$ is the projection angle, $\rho$ is the projection distance, and $f(x, y)$ is a binary image of the boundary cross-section. The projection contour of each of the scanning angles is a one-dimensional array, and the overall projection contour sets are stored as a two-dimensional matrix.

S1203, performing a cross-overlay processing on the projection contour sets to form an overlay map. Performing a correlation analysis to calculate similarity and complementarity between different projection contour sets. Performing a cross-correlation between a center projection contour and a left projection contour, and the center projection contour and a right projection contour, using a sliding window to find a target position with a highest correlation coefficient, this target position corresponds to a optimal matching offset.

During correlation calculations, local feature matching of the projection contours is considered. Higher matching weights are assigned to regions with abrupt shape changes to ensure accurate alignment of critical features. The overlay map is constructed by weighted superposition of the center projection contour, the left projection contour, and the right projection contour, where the weight coefficients reflect each contour's information contribution. The center projection contour is usually assigned a higher weight due to its better signal quality.

Performing an offset correction. Specifically, obtaining an offset from correlation analysis, applying a spatial translation to the left projection contour and right projection contour based on the offset to eliminate positional deviations caused by imaging sequence or optical path differences. The weight coefficients are optimized using the least squares method, with the objective function being the continuity and smoothness of overlaid contours.

S1204, identifying boundary overlap regions based on the overlay map. A threshold segmentation method is applied, with a threshold set to 70% of a maximum intensity in the overlay map. Regions with intensity above the threshold are marked as candidate overlap regions. The spatial coordinates of these candidates are retrieved by an inverse Radon transform, converting the angle-distance coordinates from projection space back to x-y coordinates in the image domain.

Applying an coordinate correction based on a left offset value and a right offset value obtained from correlation analysis, to ensure accurate alignment of left and right regions. The geometric parameters of the overlap region include the region's center coordinates, area, and shape factor. The shape factor is assessed by calculating a ratio of a square of a perimeter to the area, indicating the regularity of the region. Overlap intensity analysis is conducted by computing a mean and variance of pixel intensity within the region to evaluate the reliability and consistency of the overlap. Spatial pattern recognition is performed using clustering analysis to merge adjacent small overlap regions into larger ones, avoiding over-segmentation.

Multiple overlap regions are ranked based on a composite score combining intensity and area, with intensity weighted at 0.6 and area at 0.4. The region with the highest composite score is selected as a primary boundary overlap region.

Performing a shape analysis on the boundary overlap region to determine the boundary distortion. Coming an edge detection with a morphological processing to identify edge pixels within the boundary overlap region. The edge detection algorithm combines the precise localization capability of the canny operator and the noise suppression advantage of the LOG operator, forming complete contour curves using a dual-threshold strategy. Morphological operations include: a closing to connect broken edges; and an opening to remove spurious noise. This ensures the contour's continuity and smoothness.

A contour tracking algorithm starts from a seed point and follows the eight neighborhood connectivity rule to trace a complete contour, recording the coordinates of contour points in sequence. Shape analysis uses geometric descriptors. The boundary curvature is evaluated by multiple computing the local curvature at each point on the contour, and greater curvature indicates more pronounced bending. The boundary continuity assessed by counting discontinuities and measuring their length. The boundary roughness is quantified by calculating the fractal dimension of the contour, with values between 1.0 and 1.5 representing different levels of roughness.

A degree of the boundary distortion is quantified by a shape deviation index, calculating a relative deviation between an actual contour length and an ideal straight boundary length. The contour complexity is evaluated through a proportion of high-frequency components in the Fourier descriptors-a higher proportion indicates richer contour details.

Distortion types are classified as: concave distortion, local inward dents, usually due to material loss or stress concentration; and convex distortion, local outward protrusions, possibly caused by material accumulation or thermal expansion; and wavy distortion, periodic or quasi-periodic undulations reflecting vibration effects during manufacturing; and fracture distortion, discontinuous or clearly broken contours, indicating severe structural defects.

Locating initial defect position coordinates based on the boundary distortion. The defect position for concave distortion is located at a deepest point of the distorted contour, determined by finding the point with the maximum curvature on the contour. For the convex distortion, the defect is located at the peak of the protrusion. For the wave distortion, the defect position is distributed at multiple wave crests and troughs. For the fracture distortion, the defect is located at a break point of the contour. The coordinate calculation uses a sub-pixel precision algorithm, refining pixel-level coordinates through interpolation methods.

Converting image coordinates to physical coordinates through coordinate system transformation. The converting formula is as follow: $X\_mm=(X\_pixel-X\_center)\times PixelSize$, $Y\_mm=(Y\_pixel-Y\_center)\times PixelSize$. Where, $X\_pixel$ and $Y\_pixel$ are the defect's pixel coordinates in the image, $X\_center$ and $Y\_center$ are the pixel coordinates of the image center, and PixelSize is the pixel physical size 0.05 mm/pixel; and $X\_mm$ and $Y\_mm$ are the converted physical coordinates.

Defect size estimation is based on the difference in cross-sectional width. For defects in a center area, calculating a difference between an actual width and a standard width of 2 mm. For defects in the left and right areas, calculating a difference between the actual width and a standard width of 8 mm. Defect severity assessment is based on the distortion degree of D, D<0.1 represents a minor defect; $0.1<D\leq0.3$ represents a moderate defect; $D\geq0.3$ represents a serious defect. D is the shape deviation index, representing the relative deviation between the actual contour length and the ideal straight boundary length. Using geometric calculations and coordinate transformations, the initial defect position coordinates and severity are finally located.

S130: measuring a left diffusion distance and a right diffusion distance based on the left electroluminescence image, and the right electroluminescence image, generating a diffusion asymmetry degree based on the left diffusion distance and the right diffusion distance, and determining a defect shift direction based on the asymmetry degree, and correcting the initial defect position coordinates based on the defect shift direction to generate accurate defect position coordinates.

A left diffusion distance and a right diffusion distance are measured based on the left electroluminescence image, and the right electroluminescence image. The left electroluminescence image shows an intensity decay distribution from the irradiation area outward, where an intensity decay curve follows an exponential function. The decay constant reflects the material's carrier diffusion properties.

Determining the diffusion boundary by a dual-threshold detection method. A first threshold is set to 20% of a peak intensity to roughly determine the diffusion range. A second threshold is set to 10% to precisely define the diffusion boundary. The left diffusion distance D_left is measured by scanning each row of the left electroluminescence image from the center of the irradiation area to the left, recording the pixel position where the intensity drops to the second threshold. The measurement process adopts sub-pixel interpolation technology, which improves the distance measurement accuracy to 0.1 pixels through cubic spline interpolation. The right diffusion distance D_right is measured similarly, ensuring consistency in the left and right measurements.

The conversion from pixel distance to physical units (mm) is achieved through pixel calibration. The anisotropy of carrier diffusion is captured by scanning in multiple angles, including diagonal diffusion measurements, in addition to the horizontal direction, the effect of distortion types on diffusion measurements is considered. Concave distortion focuses on measuring the diffusion characteristics in the concave area, and convex distortion focuses on measuring the diffusion behavior at the protruding edge.

As shown in FIG. 7, step S130 generating a diffusion asymmetry degree based on the left diffusion distance and the right diffusion distance includes the following steps of S1301 to S1304.

S1301, forming diffusion trajectories based on the left diffusion distance and the right diffusion distance.

S1302, identifying diffusion acceleration segments and diffusion deceleration segments from the diffusion trajectories.

S1303, conducting a duration comparison analysis on the diffusion acceleration segments and the diffusion deceleration segments to generate a duration difference value.

S1304, generating the diffusion asymmetry degree based on the duration difference value.

Specifically, S1301, forming diffusion trajectories based on the left diffusion distance and the right diffusion distance.

The duration difference between the acceleration segment and deceleration segment is calculated to produce the duration difference value, which is then used to generate the diffusion asymmetry degree. The diffusion trajectory describes a complete path of carrier transport from the irradiation area to left and right sides. The diffusion trajectory is constructed based on the physical model of carrier diffusion and the measured diffusion distance data. The carrier diffusion process in the solar cell is influenced by various physical mechanisms. Random thermal motion leads to diffusion transport, built-in electric fields cause drift motion, and defects and impurities cause scattering and recombination. A diffusion-drift equation is adopted to describe the diffusion trajectory, the diffusion-drift equation is: $n/t=D\Delta^2 n-\mu E\cdot\Delta n-n/\tau$, where n is a carrier concentration, D is a diffusion coefficient, u is a mobility, E is an electric field strength, and $\tau$ is a carrier lifetime.

The spatial description of the trajectory is achieved through parameterization, with the left trajectory extending from the center of the irradiation area to the measured left diffusion distance, and the right trajectory extending similarly to the right diffusion distance. The carrier concentration at each point on the trajectory is interpolated from the electroluminescence intensity data, and the concentration gradient reflects the diffusion driving force's magnitude and direction. Curvature analysis of the diffusion trajectory reveals the degree of bending; a straight trajectory indicates uniform diffusion, while a curved trajectory suggests the influence of local electric fields or defects.

S1302, identifying diffusion acceleration segments and diffusion deceleration segments from the diffusion trajectories. The carrier transport velocity (v) is calculated based on the concentration gradient and diffusion coefficient between adjacent points on the trajectory: $v=-D(\Delta n/n)$. A shape of the velocity curve reveals the diffusion process's dynamic mechanism. The acceleration segment corresponds to intervals where the velocity increases, typically near the irradiation area where carriers have higher initial energy and are accelerated by the built-in electric field. The deceleration segment corresponds to intervals where the velocity decreases, mainly in the later stages of diffusion as carriers lose energy due to scattering, recombination, and weakening electric fields. The segmentation is performed using velocity gradient analysis, where the acceleration segment is defined as $dv/dx>0$, and the deceleration segment is defined as $dv/dx<0$.

Boundary points between the acceleration segment and the deceleration segment are determined by the extreme points of the velocity curve, with local maxima indicating the end of the acceleration segment and local minima indicating the start of the deceleration segment.

S1303, conducting a duration comparison analysis on the diffusion acceleration segments and the diffusion deceleration segments to generate a duration difference value. The acceleration segment duration T_accel is calculated by integrating the inverse of the velocity along the diffusion trajectory, considering the continuous variation of carrier speed. The deceleration segment duration T_decel is calculated in the same way to ensure consistency and comparability. The physical basis for duration calculation is the carrier's residence time in different speed regions; the low-speed region contributes more to the total time because it takes longer to pass through. The duration difference value is defined as: $\Delta T=T\_accel-T\_decel$, Where $\Delta T$ is the duration difference, T_accel is the acceleration segment duration, and T_decel is the deceleration segment duration. A positive $\Delta T$ indicates that the acceleration process takes longer, meaning carriers spend more time in high-speed transport, typically in areas with better cell quality and fewer internal defects. A negative $\Delta T$ indicates that the deceleration process dominates, suggesting the presence of obstacles such as grain boundaries, dislocations, or impurities in that region. The absolute value $|\Delta T|$ reflects the imbalance between the acceleration and deceleration processes, with larger values indicating greater non-uniformity in the transport process. The left and right side duration differences $\Delta T\_left$ and $\Delta T\_right$ are calculated separately, and their comparison reveals structural differences between the left and right sides of the solar cell.

S1304, generating the diffusion asymmetry degree based on the duration difference value. The diffusion asymmetry is defined using a relative difference metric:

$$\text{Asymmetry} = |\Delta T\_left - \Delta T\_right|/\max(|\Delta T\_left|, |\Delta T\_right|).$$

Where, Asymmetry represent a value of the diffusion asymmetry, $\Delta T\_left$ and $\Delta T\_right$ are the duration difference values on the left and right sides, respectively. The denominator takes the maximum of the two absolute values to normalize the asymmetry to the [0, 1] range.

The asymmetry reflects the left-right balance of carrier transport. Asymmetry=0, which indicates completely symmetrical diffusion, suggesting uniform internal structure and similar carrier transport properties on both sides. If the Asymmetry approaching 1 suggests highly asymmetric diffusion, implying significant structural non-uniformities or localized defects, where one side's transport characteristics differ substantially from the other.

Intermediate values of the asymmetry (0.3-0.7) typically correspond to gradient-type defects, such as doping concentration gradients or uneven stress distribution. The diffusion asymmetry also provides insight into defect types and distribution. Point defects usually cause local asymmetry peaks, with effects limited to a few diffusion lengths around the defect. Line defects, such as cracks or scratches, may cause stripe-like asymmetry along the defect's direction. Planar defects, such as grain boundary networks, can lead to large-area asymmetric patterns.

Determining a defect shift direction based on the asymmetry degree. The shift direction angle $\theta\_offset$ is calculated from the ratio of left and right duration differences, using the arctangent function to convert the ratio into an angle. This calculation considers both the sign and relative magnitude of the duration difference values to ensure accurate directional judgment. A positive angle indicates the defect is offset to the left side, where carrier transport is more affected than on the right. A negative angle indicates the defect is offset to the right side. The magnitude of the angle reflects the severity of the offset. Angles near $\pm45°$ indicate extreme one-sided offset, while angles near $0°$ suggest the defect is near the center or symmetrically affecting both sides.

The offset intensity is proportional to the diffusion asymmetry, the greater the asymmetry, the more reliable the direction estimate, and the better the offset angle reflects the true defect location. An effectiveness judgment of defect shift direction is based on asymmetry threshold. When Asymmetry >0.2, the defect shift direction is statistically significant and can be used for coordinate correction. When Asymmetry is between 0.1 and 0.2, the defect shift direction can serve as a secondary reference and should be considered with other data. When Asymmetry <0, 1, no significant defect shift direction is assumed, the defect is likely near the center of the irradiation area or symmetrically distributed.

Correcting the initial defect position coordinates based on the defect shift direction to generate accurate defect position coordinates. The initial defect position (X_initial, Y_initial) is obtained from image boundary features but may include systematic deviation due to carrier diffusion effects. The shift direction θ_offset, derived from physical carrier transport mechanisms, provides an independent correction reference.

Coordinate correction follows a vector superposition principle. The correction vector has a direction of θ_offset, and a value of the correction vector related to diffusion Asymmetry and the average diffusion distance. The correction distance is described as R_correction=k×Asymmetry×D_avg, where, R_correction represents correction distance, k is an experienced correction coefficients, Asymmetry is the diffusion asymmetry, D_avg is the average of left and right diffusion distances, D_avg=(D_left+D_right)/2.

The experienced correction coefficient k is adjusted based on defect severity based on the following principles: minor defect (D<0, 1), k=0.3; and moderate defect (0.1≤D<0.3), k=0.5; and serious defect (D>0.3), k=0.7.

The precise defect coordinates are obtained through vector operation, X_precise=X_initial+R_correction×cos (θ_offset), and Y_precise=Y_initial+R_correction×sin (θ_offset). Where, X_precise and Y_precise are precise defect coordinates after corrected. This correction process integrates geometry-based localization with physics-based carrier transport analysis to produce accurate defect coordinates.

S140: extracting a center luminescence intensity from the center photoluminescence image, and extracting an edge luminescence intensity from the left electroluminescence image, and the right electroluminescence image, and forming a luminescence gradient curve based on the center luminescence intensity and the edge luminescence intensity, and identifying intensity jumping points through the luminescence gradient curve.

Extracting a center intensity from the center photoluminescence image. The image is divided into multiple sampling regions of 5×5 pixels, ensuring local intensity changes can be captured while maintaining spatial resolution.

The central intensity I_center is computed by the weighted average of pixel grayscale values, with weights determined by the pixel's distance to the region center—closer pixels carry higher weight. Normalization converts raw grayscale values into relative intensity values in the 0 to 1 range for easier comparison. The spatial characteristics of the central intensity are described by mean and standard deviation, reflecting the concentration of luminescence distribution. Noise reduction uses a combination of median filtering and Gaussian filtering to remove random noise from image acquisition. Sampling regions are focused on potential defect zones, increasing sampling density in those areas to enhance analysis precision.

Extracting an edge luminescence intensity from the left electroluminescence image, and the right electroluminescence image. Edge regions are defined based on carrier diffusion distances, with the edge position set at 80% of the diffusion distance from the irradiated center, ensuring the boundary effects of carrier transport are captured.

A line scan method is used for intensity sampling, performing a pixel intensity sampling along a line segment perpendicular to the diffusion direction, with a sampling interval set to 1 pixel. Edge luminescence intensity reflects carrier concentration gradients, and the intensity value is proportional to the gradient magnitude.

Asymmetry in edge intensity is analyzed by an intensity ratio: R_asymmetry=I_edge_left/L_edge_right, where R_asymmetry is the asymmetry ratio, Ledge_left is the left edge luminescence intensity, and Ledge_right is the right edge luminescence intensity. Spatial differentiation of intensity reveals the rate of intensity change near the edges, with higher differential values indicating steeper concentration gradients.

Figure 8:
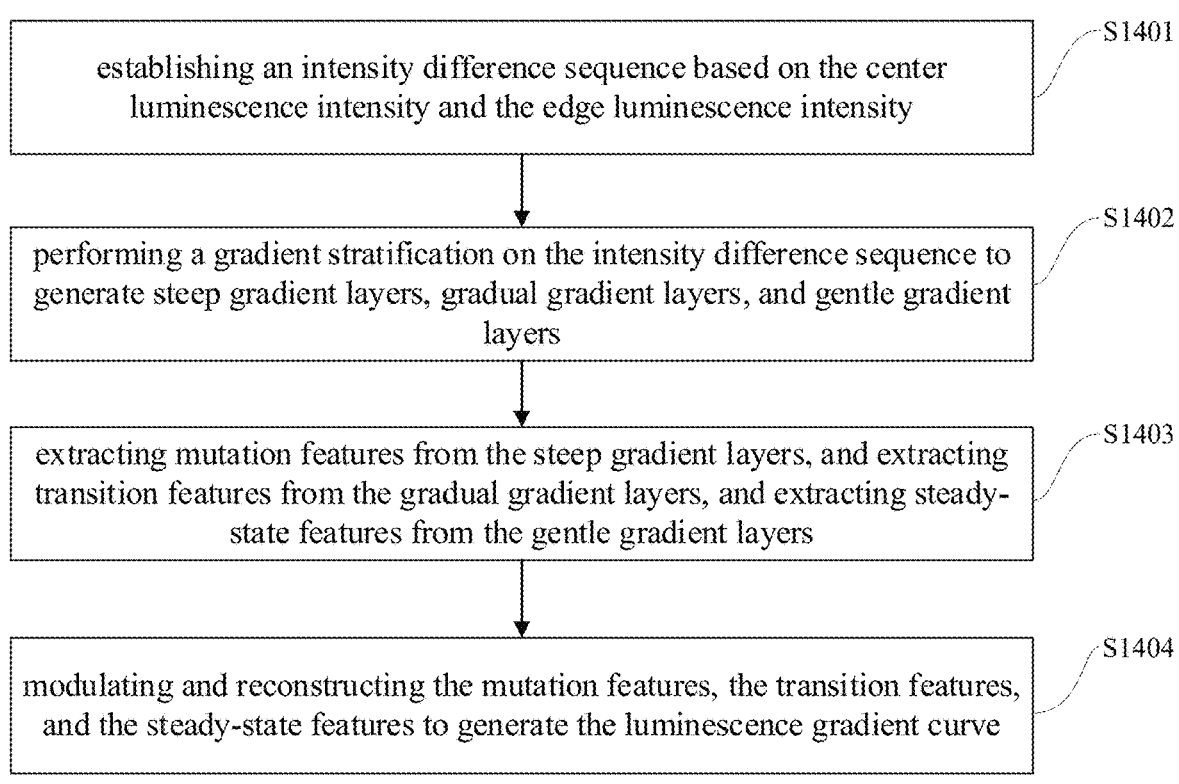
FIG. 8 is a fifth detailed flowchart of the non-contact electroluminescence defect detection method according to an embodiment of the present disclosure.

As shown in FIG. 8, a part of S140, forming a luminescence gradient curve based on the center luminescence intensity and the edge luminescence intensity includes:

S1401, establishing an intensity difference sequence based on the center luminescence intensity and the edge luminescence intensity.

S1402, performing a gradient stratification on the intensity difference sequence to generate steep gradient layers, gradual gradient layers, and gentle gradient layers.

S1403, extracting mutation features from the steep gradient layers, and extracting transition features from the gradual gradient layers, and extracting steady-state features from the gentle gradient layers.

S1404, modulating and reconstructing the mutation features, the transition features, and the steady-state features to generate the luminescence gradient curve.

Specifically, S1401, establishing an intensity difference sequence based on the center luminescence intensity and the edge luminescence intensity. Sampling along radial paths from center to edge, with spacing set to one-tenth of the carrier diffusion length. The intensity difference sequence is D(i)=I_center (i)−L_edge(i). At each point i, the difference between central intensity and edge intensity is computed. The sequence length is equal to the total number of sampling points from the center to the edge, with a typical value of 50-100 sampling points, covering the entire center-to-edge path.

The sign of the difference indicates intensity direction. Positive values mean central intensity is higher; negative means the opposite. Statistical features (mean, variance) describe the sequence's overall behavior. Autocorrelation analysis reveals spatial correlations in the intensity difference and the characteristic scale of carrier diffusion. Outliers exceeding three times the standard deviation are flagged.

S1402, performing a gradient stratification on the intensity difference sequence to generate steep gradient layers, gradual gradient layers, and gentle gradient layers.

The gradient calculation uses the central difference method to obtain the gradient sequence by differentiating the difference sequence. The sharp gradient layer corresponds to regions where the absolute value of the derivative exceeds the upper threshold, set to twice the standard deviation of the gradient sequence, to ensure the capture of the most significant intensity jumps. The moderate gradient layer corresponds to regions where the absolute value of the derivative is between the upper and lower thresholds, with the lower threshold set to 0.5 times the standard deviation, indicating moderate intensity changes. The smooth gradient layer corresponds to regions where the absolute value of the derivative is smaller than the lower threshold, indicating relatively stable intensity changes. The spatial distribution of each layer is recorded in a layer labeling matrix. The identification of layer transition points uses a sliding window method, with a window size of 5 sampling points. Continuity analysis of the sharp gradient layer identifies isolated sharp points and continuous sharp regions. If the length of a continuous region is greater than 3 sampling points, it is considered a valid sharp gradient layer.

S1403, extracting mutation features from the steep gradient layers, and extracting transition features from the gradual gradient layers, and extracting steady-state features from the gentle gradient layers.

Mutation features include the jump amplitude A_jump, jump width W_jump. Jump sharpness is S_jump=A_jump/W_jump, which reflects the steepness of the jump. The jump amplitude is calculated by the intensity difference at the ends of the region, and the jump width is the spatial span of the region.

Transition features include the transition slope K_trans, transition length, and transition smoothness. The transition slope is calculated by linear fitting, and the goodness of fit is used as a measure of smoothness.

The steady-state features include a steady-state mean, a steady-state variance, and a steady-state duration. The steady-state mean is the average intensity within the smooth layer, and the steady-state variance reflects the degree of intensity fluctuation. Based on carrier transport mechanisms, mutation features correspond to rapid changes in carrier concentration, transition features correspond to gradual carrier diffusion, and the steady-state features correspond to the equilibrium state of carrier distribution.

Figure 9:
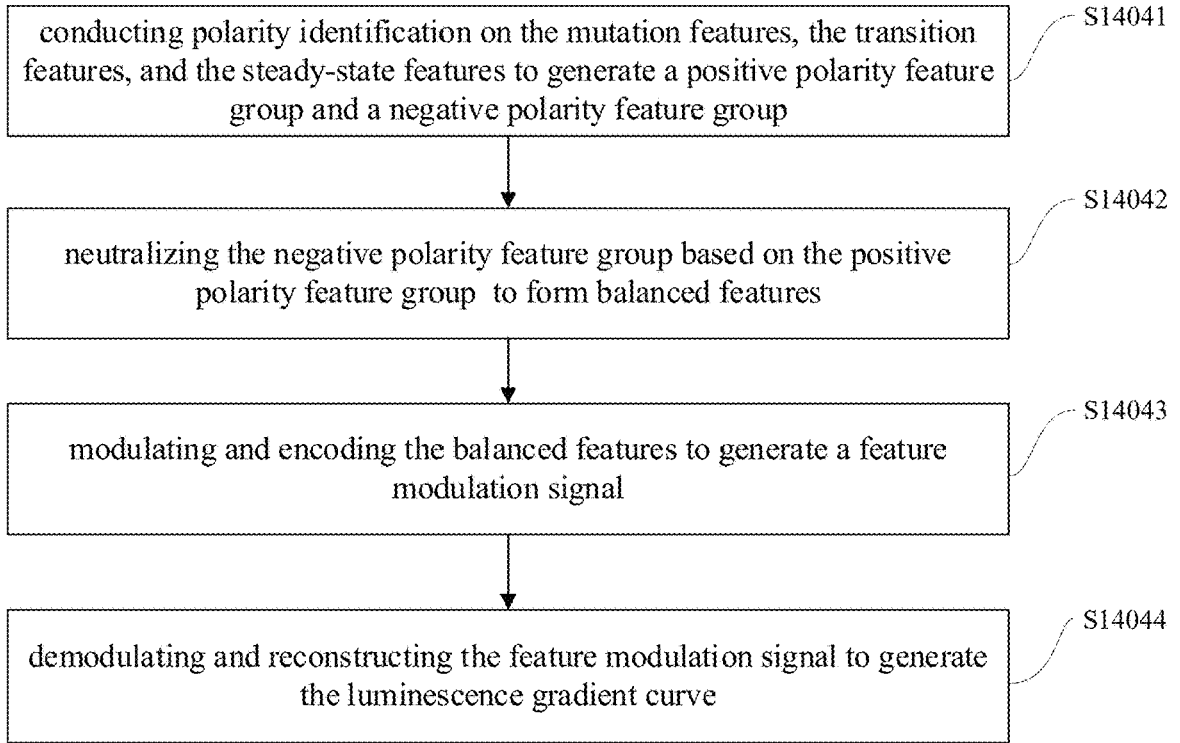
FIG. 9 is a sixth detailed flowchart of the non-contact electroluminescence defect detection method according to an embodiment of the present disclosure.

As shown in FIG. 9, S1404, modulating and reconstructing the mutation features, the transition features, and the steady-state features to generate the luminescence gradient curve includes:

S14041, conducting polarity identification on the mutation features, the transition features, and the steady-state features to generate a positive polarity feature group and a negative polarity feature group.

S14042, neutralizing the negative polarity feature group based on the positive polarity feature group to form balanced features.

S14043, modulating and encoding the balanced features to generate a feature modulation signal.

S14044, demodulating and reconstructing the feature modulation signal to generate the luminescence gradient curve.

Specifically, S14041 conducting polarity identification on the mutation features, the transition features, and the steady-state features to generate a positive polarity feature group and a negative polarity feature group.

Feature polarity identification is based on the signs and direction of change of various feature parameters for classification. The polarity of mutation features is determined by the direction of the jump. When the intensity jumps from low to high, it is a positive polarity mutation; when it jumps from high to low, it is a negative polarity mutation. Positive polarity mutation features include the magnitude of forward jump, jump position, and jump sharpness. While negative polarity mutation features correspond to negative jumps. The polarity of transition features is determined by the sign of the transition slope. When the slope is positive, it is a positive polarity transition; when the slope is negative, it is a negative polarity transition. The polarity of steady-state features is determined by the deviation of the steady-state mean from the global mean. When the steady-state mean is higher than the global mean, it is a positive polarity steady-state; when it is lower, it is a negative polarity steady-state. The positive polarity feature group contains all positive polarity features, while the negative polarity feature group contains all negative polarity features. The reliability of polarity identification is evaluated through polarity strength, which is defined as the degree of deviation of the feature parameters from zero; the greater the deviation, the more obvious the polarity.

S14042, neutralizing the negative polarity feature group based on the positive polarity feature group to form balanced features. A pairing matching method is used to find feature pairs with similar spatial positions and comparable feature parameters. Pairing criteria include spatial distance criteria and amplitude criteria to ensure that paired features match both spatially and in intensity. Features that successfully pair undergo neutralization operations. If the amplitude after neutralization is smaller than the minimum threshold, the feature pair is considered fully neutralized and removed from the feature set; if the amplitude after neutralization is greater than the minimum threshold, the neutralized feature is retained. Features that fail to pair retain their original parameters and are directly added to the balanced feature set.

The balanced feature set contains all features that are retained after neutralization, representing the real physical effects that cannot cancel each other out. Based on the symmetry of carrier transport, symmetric carrier distribution should generate mutually canceling positive and negative polarity features, while asymmetric distribution retains a net polarity feature.

Based on the symmetry of carrier transport, symmetric carrier distributions should produce mutually canceling positive and negative polarity features, while asymmetric distributions retain net polarity features.

S14043, modulating and encoding the balanced features to generate a feature modulation signal. The modulation adopts a hybrid modulation method, combining amplitude modulation and frequency modulation to leverage their complementary properties.

An amplitude modulation part uses a sine wave as the carrier signal, with the carrier frequency set to ten times the feature spatial frequency to ensure no spectral aliasing. The modulation signal consists of the amplitude sequence of the balanced features, and interpolation is used to convert discrete feature data into a continuous signal.

The modulation depth adjusts adaptively based on feature significance, more significant features correspond to larger modulation depths. The amplitude modulation signal is generated by multiplying the carrier and modulation signals.

An frequency modulation part is achieved by adjusting the instantaneous frequency of the carrier signal, where the instantaneous frequency is a sum of the carrier frequency and frequency offset. The frequency offset coefficient is determined by the feature's dynamic range, controlling the amplitude of the frequency change.

The hybrid modulation signal is synthesized through weighted summation, with the weight determined by the modulation effect to balance information fidelity and anti-noise properties.

S14044, demodulating and reconstructing the feature modulation signal to generate the luminescence gradient curve.

Envelope detection is used for demodulation. First, obtain the analytic signal of the modulation signal through mathematical transformation. Then, computing the envelope of the signal. Finally, using low-pass filtering to remove the carrier component and recover the modulation signal.

Frequency demodulation uses a phase detector method. Computing the time derivative of a phase of the analytic signal to obtain the instantaneous frequency. Subtracting the carrier frequency from the instantaneous frequency to recover the frequency offset. Using the frequency offset to recover the modulation signal. Signal fusion for demodulation uses weighted averaging, with weights identical to those used during modulation encoding.

The gradient curve reconstruction is performed using interpolation. Converting the demodulated feature parameter sequence back into a spatial domain and generate a continuous gradient curve using cubic spline interpolation. Post-processing of the gradient curve includes boundary correction and smoothing filtering to ensure the curve's physical validity and numerical stability.

Identifying intensity jumping points through the luminescence gradient curve. A multi-scale analysis method is used to search for significant gradient changes at different spatial scales. Analyzing a first-order derivative, computing the first derivative of the gradient curve, with jumping points corresponding to local extrema of the derivative. Analyzing a second-order derivative, computing the second derivative of the gradient curve, with jumping points corresponding to zero-crossings of the second derivative.

Quantifying jump intensity, the jump intensity is quantified by calculating the maximum derivative value at the jumping points. The spatial localization precision of jumping points is improved using sub-pixel interpolation.

Verifying the jumping points based on multiple criteria, the jump intensity exceeding a threshold, consistency of jumping point location with anomaly locations, and support from the edge intensity asymmetry ratio. Classifying the jumping points based on jump direction and intensity, positive jumps correspond to increasing intensity, and negative jumps correspond to decreasing intensity. Using multi-scale analysis and multiple validation criteria, the luminescence gradient curve ultimately identifies intensity jumping points that reflect carrier concentration mutations.

S150, adopting the intensity jumping points as dividing points to segment a luminescence response interval, establishing an energy distribution index based on the luminescence response interval, identifying energy conversion defects at the accurate defect position coordinates based on the energy distribution index.

The intensity jumping points are used as dividing points to segment the luminescence r scanning algorithm is applied, starting from the beginning of the image. Upon encountering an intensity jumping point, the current interval ends, and a new interval begins. The directionality of the jumping point is considered. A positive jumping point marks the beginning of an energy enhancement interval, while a negative jumping point marks the end of an energy attenuation interval. This directionality guides the precise localization of interval boundaries.

Statistical analysis of interval lengths has different spatial scales. Short intervals often correspond to local defect influence zones. Medium intervals correspond to normal carrier diffusion regions. Long intervals may indicate large, uniform material regions.

Within each interval, the intensity distribution is analyzed through parameters such as mean, variance, gradient, and monotonicity, reflecting the stability and uniformity of energy conversion. Sub-pixel interpolation and parabolic fitting near jumping points are used to refine boundary positions to sub-pixel precision. Intervals are labeled in a sequential manner, from left to right or from center outward, for convenient analysis of features and energy distribution calculations. The validity of the segmentation is verified by examining internal consistency in intensity variations, ensuring relatively uniform energy distribution characteristics within each interval.

As shown in FIG. 10, a part of S150, establishing an energy distribution index based on the luminescence response interval includes the following steps of S1501-S1504.

S1501, identifying energy-dense segments and energy-sparse segments within the luminescence response interval.

S1502, calculating concentration indices based on the energy-dense segments, and calculating dispersion indices based on the energy-sparse segments.

S1503, performing an energy balance evaluation based on the concentration indices and the dispersion indices to generate balance parameters.

S1504, generating the energy distribution index based on the balance parameters.

Specifically, S1501, identifying energy-dense segments and energy-sparse segments within the luminescence response interval. An energy-dense segment is defined as a continuous region where luminescence intensity is significantly higher than the interval mean, indicating active carrier recombination and high energy conversion efficiency. The identification criterion includes a threshold condition: $I(x) > I\_meant \alpha \times \sigma$, where, $I(x)$ is the intensity at position x, $I\_mean$ is the interval mean, $\sigma$ is the standard deviation, and $\alpha$ is a threshold factor (e.g., 1.5). Continuity requires that these high intensity pixels form continuous segments longer than a minimum threshold.

Energy sparse segments are regions where intensity is significantly lower than the interval mean, using the opposite threshold condition: $I(x) < I\_mean - \alpha \times \sigma$. Segment boundary smoothing uses morphological filtering to remove noise-induced small splits while preserving the true energy distribution features. Segment characteristics include length, mean intensity, and intensity variance, which quantify energy distribution. The spatial distribution of segments is analyzed by calculating the proportion and pattern of each type within the interval.

S1502, calculating concentration indices based on the energy-dense segments, and calculating dispersion indices based on the energy-sparse segments.

The concentration calculation adopts the weighted variance method: $Concentration = \Sigma[I(x) \times (x - x\_center)^2]/\Sigma[I(x)]$, Where $I(x)$ is the intensity value at position x, and $x\_center$ is the center of gravity position of the intensity in the dense section.

The formula for calculating the center of gravity position is: $x\_center = \Sigma[I(x) \times x]/\Sigma[I(x)]$, which represents the center of gravity of the intensity distribution. The concentration is normalized to [0, 1], to facilitate comparison between different sections, where smaller values indicate tighter energy concentration. The concentration index quantifies the degree of energy accumulation in dense segments, with smaller values indicating greater concentration of energy. A dispersion index quantifies the degree of energy dispersion and unevenness in sparse segments. High dispersion indicates significant variation in energy conversion within sparse segments. The dispersion is calculated using the relative standard deviation method: $Dispersion = \sigma\_sparse/I\_mean\_sparse$, among them, $\sigma\_sparse$ is the standard deviation of the strength of the sparse section, and $I\_mean\_sparse$ is the average strength of the sparse section. The multidimensional representation of dispersion includes two aspects: intensity dispersion and spatial dispersion, which comprehensively reflect the energy distribution characteristics of energy-sparse segments.

S1503, performing an energy balance evaluation based on the concentration indices and the dispersion indices to generate balance parameters. Applying composite analysis, and combing the concentration and dispersion metrics to energy assess distribution. The concentration-dispersion balance index is calculated by the ratio: Balance_CD=Concentration/(Concentration+Dispersion), where values near 0.5 indicate balance, and deviation 0.5 implies dominance of one aspect.

The spatial balance index is evaluated by the spatial proportion of dense segment and sparse segment: Balance_spatial=min (A_dense, A_sparse)/max (A_dense, A_sparse); where A_dense and A_sparse indicates the areas of the dense segment and the sparse segment. The intensity balance index compares average intensities of dense and sparse segments, with larger values indicating more significant differences in intensity.

The overall energy balance parameter is obtained by weighted averaging of all indices, and is calculated by the following formula:

$$\text{Balance\_total} =$$
$$0.4 \times \text{Balance\_CD} + 0.3 \times \text{Balance\_spatial} + 0.3 \times \text{Balance\_intensity}.$$

The weights are determined based on the sensitivity of each index to energy conversion anomalies, established experimentally. A high balance parameter suggests stable and uniform energy conversion, while a low parameter indicates potential defects or irregularities in energy conversion.

S1504, generating the energy distribution index based on the balance parameters.

The energy distribution index converts balance parameters into quantitative indicators for defect identification, considering the efficiency, uniformity, and stability of energy distribution.

The energy distribution efficiency index evaluates the overall efficiency of energy conversion within the response range, calculated by the ratio of integrated light intensity to input energy. The efficiency is calculated by the formula: Efficiency=∫I(x) dx/E_input.

Energy distribution uniformity index is computed based on the overall energy balance parameter: Uniformity=Balance_total, where Uniformity represent energy distribution uniformity index, and value of the energy distribution uniformity index closer to 1 indicate more uniform distribution.

Energy distribution stability index is derived from statistical fluctuation characteristics using the inverse coefficient of variation. And the energy distribution stability index is represented in a reciprocal form of the coefficient of variation: Stability=1/(σ/μ).

Energy gradient index measures spatial variation in energy distribution, and the energy gradient index is obtained by the root mean square of intensity gradients.

The energy distribution efficiency index, the energy distribution uniformity index, the energy distribution stability index and the energy gradient index are combined into a four-dimensional feature vector: EAI=[Efficiency, Uniformity, Stability, Gradient].

Each component reflects a different aspect of energy conversion. Efficiency, overall conversion capability; uniformity, spatial distribution characteristics; stability, fluctuation resistance; gradient, spatial variation.

Identifying energy conversion defects at the accurate defect position coordinates based on the energy distribution index. A spatial interpolation method is used to obtain the index values at defect locations that are not sampled within the response range, using cubic spline interpolation. Defect type classification is based on pattern recognition of energy distribution indices, when the energy distribution efficiency index is below 70% of a normal value, it is classified as an energy conversion efficiency defect; when the energy distribution uniformity index is below 0.5, it is classified as an energy distribution imbalance defect; when the energy distribution stability index is below 2.0, it is classified as an energy fluctuation defect; and when the energy gradient index exceeds the threshold, it is classified as an energy mutation defect. The severity of defects is quantified by the degree of deviation from the normal value, minor defects correspond to a deviation of 10-30%, moderate defects correspond to a deviation of 30-50%, and serious defects correspond to a deviation greater than 50%. The defect impact range is analyzed by calculating the spatial range of abnormal s around the defect location, determining the defect's effective radius. Based on the combination of indices, the energy conversion mechanism is inferred: low efficiency may correspond to carrier recombination centers, poor uniformity may correspond to local material inhomogeneity, poor stability may correspond to dynamic defect processes, and abnormal gradients may correspond to interface defects. The spatial correlation analysis of defects identifies the interactions between adjacent defects, with isolated defects and clustered defects exhibiting different index characteristics. Through multi-dimensional index analysis and physical mechanism inference, accurate identification and classification of energy conversion defects are ultimately achieved.

S160, conducting a conduction path analysis based on the accurate defect position coordinates and the energy conversion defects to determine a defect coupling coefficient; identifying defect types based on the defect coupling coefficient, and outputting a spatial positioning map based on the defect types, completing the non-contact electroluminescence defect detection.

As shown in FIG. 11, a part of S160, conducting a conduction path analysis based on the accurate defect position coordinates and the energy conversion defects to determine a defect coupling coefficient includes the following steps of S1601-S1603.

S1601, establishing defect impact boundaries based on the accurate defect position coordinates.

S1602, tracking a conduction path of the energy conversion defects within the defect influence boundaries, to identify a conduction enhancement path and a conduction attenuation path.

S1603, determining the defect coupling coefficient based on a length ratio of the conduction enhancement path and the conduction attenuation path.

Specifically, S1601, establishing defect impact boundaries based on the accurate defect position coordinates. Using an equipotential line tracing algorithm, the defect's precise position is taken as a starting point, and energy distribution is traced outward to find positions where significant changes in energy distribution occur, which serve as the impact boundaries. The boundary criterion is based on the energy gradient threshold, when the energy gradient falls below 20% of the peak gradient, it is considered to have exceeded the primary influence range of the defect.

Analysis of the boundary shape reveals different boundary characteristics for different types of defects. Point defects typically have near-circular impact boundaries, line defects exhibit elliptical or strip-shaped boundaries, surface defects have irregular and complex boundaries.

The boundary size is quantified using the equivalent radius method, which calculates the equivalent impact range based on the area enclosed by the impact boundary. Dynamic boundary characteristics are considered in the evolution of carrier transport over time, where static boundaries correspond to stable defects, and dynamic boundaries may correspond to carrier trap charging/discharging processes.

Boundary overlap analysis identifies the overlapping regions of adjacent defect influence areas, where defect interactions and coupling effects may occur. Energy distribution comparisons inside and outside the boundary verify the reasonableness of the boundary setting: the inside should exhibit significant energy anomalies, while the outside should resemble the normal energy distribution.

S1602, tracking a conduction path of the energy conversion defects within the defect influence boundaries, to identify a conduction enhancement path and a conduction attenuation path.

Applying a gradient descent method to trace the possible carrier transport paths, starting from multiple points on the boundary and following the direction of the energy gradient. Conductive enhancement paths correspond to regions with higher energy density and lower transport resistance, typically continuous high energy density regions where carriers can efficiently transfer and convert energy.

The recognition criteria for enhancement paths include: an average energy density along the path being greater than 1.2 times the boundary's mean energy density, good continuity with no obvious breaks, and path width meeting a minimum requirement for effective carrier transport. Conductive attenuation paths correspond to regions with lower energy density and transport resistance, typically energy-sparse segments or areas with scattering centers for carriers.

The recognition criteria for attenuation paths include: the average energy density along the path being less than 0.8 times the boundary's mean energy density, potential breaks or discontinuities in the path, and possible energy traps or recombination centers along the path. Geometric characteristics of the paths are analyzed, including path length, width, curvature, and the number of branches. These parameters quantify the geometric features of different paths. During the path tracking process, energy distribution curves along each path are recorded for subsequent coupling coefficient calculations.

S1603, determining the defect coupling coefficient based on a length ratio of the conduction enhancement path and the conduction attenuation path. The total path length is calculated using a spatial integration method along the geometric trajectory of the paths. The total length of conductive enhancement paths L_enhance is obtained by summing the lengths of all enhancement paths, while the total length of conductive attenuation paths L_decay is calculated similarly.

The basic coupling coefficient is calculated as the length ratio:

$$Coupling\_basic = L\_enhance/(L\_enhance + L\_decay).$$

Values close to 1 indicate dominance of enhancement paths, values close to 0 indicate dominance of attenuation paths, and values near 0.5 indicate a balance between the two types of paths.

To account for differences in path transmission efficiency, a weight correction is introduced:

$$Coupling\_weighted =$$
$$\sum(w\_i \times L\_enhance\_i)/\sum(w\_i \times L\_enhance\_i + w\_j \times L\_decay\_j).$$

Where, w is the weight based on the average energy density along the path, and w=E_avg/E_boundary; where E_avg is the average energy density along the path, while E_boundary is the boundary's average energy density. The corrected coupling coefficient more accurately reflects the defect's actual impact on carrier transport. A high coupling coefficient indicates that the defect promotes carrier transport and energy conversion, a low coefficient indicates that the defect hinders carrier transport, and a medium coefficient indicates that the defect's effect on transport is relatively balanced.

Identifying defect types based on the defect coupling coefficient. Defect classification is based on carrier transport theory, including four major categories: carrier generation defects, transport defects, recombination defects, and collection defects. Carrier generation defects correspond to high coupling coefficients (Coupling>0.7), characterized by enhancement paths dominating, indicating that the defect can promote the generation or injection of carriers. Typical examples include heterojunction interfaces and carrier injection enhancement regions. Carrier transport defects correspond to mid-high coupling coefficients (0.5<Coupling≤0.7), characterized by enhancement paths slightly outnumbering attenuation paths, indicating that the defect has both promoting and hindering effects on carrier transport. Typical examples include grain boundaries and dislocations (linear defects). Carrier recombination defects correspond to low coupling coefficients (Coupling≤0.3), characterized by attenuation paths dominating, indicating that the defect mainly acts as a recombination center for carriers. Typical examples include deep-level impurities and vacancy clusters (point defects). Carrier collection defects correspond to medium coupling coefficients (0.3<Coupling≤0.5), characterized by a relative balance between enhancement and attenuation paths, indicating that the defect has a complex effect on the carrier collection process. Typical examples include surface states and interface defects. The severity of defects is evaluated based on the absolute deviation of the coupling coefficient and the impact boundary size.

Outputting a spatial positioning map based on the defect types, completing the non-contact electroluminescence defect detection. A layered overlay method is used to construct the spatial positioning map. A bottom layer shows the geometry and structural information of the solar cell, a middle layer displays the spatial distribution of different defect types, a top layer provides defect identification and parameter information.

Defect positions are marked with different colors and symbols: carrier generation defects are marked with green circles; carrier transport defects are marked with blue squares; carrier recombination defects are marked with red triangles; carrier collection defects are marked with yellow diamonds. The severity of defects is represented by the size of the marks: minor defects: small marks (3 mm diameter); moderate defects: medium marks (5 mm diameter); and serious defects: large marks (8 mm diameter).

The visualization of the impact boundary uses contour lines, with different color intensities indicating different impact strengths. The spatial positioning map's scale and coordinate system ensure measurement accuracy, with the coordinate origin set at the center of the solar cell's geometry. The legend explains the meaning of the various symbols, color codes, and size relationships. The digital output of the spatial positioning map supports various standard formats, including bitmap for intuitive display and vector format for precise measurement. The detection report contains defect statistics: total defect count, distribution of defect types, and defect position coordinates. Through systematic conductive path analysis and defect classification, a complete spatial spatial positioning map is generated, achieving a full process for non-contact electroluminescence defect detection in the solar cell.

To implement the non-contact electroluminescence defect detection method corresponding to the embodiment of the above method, in order to achieve the corresponding functions and technical effects.

Figure 12:
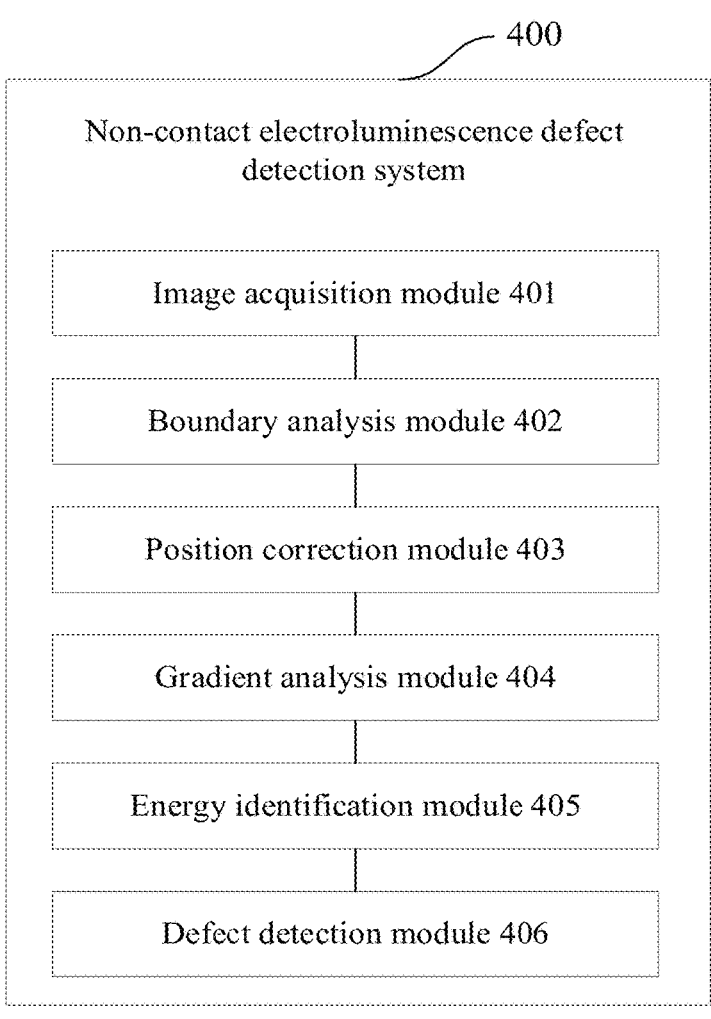
FIG. 12 is a block diagram of a non-contact electroluminescence defect detection system according to an embodiment of the present disclosure.

Referring to FIG. 12, FIG. 12 shows a block diagram of the structure of a non-contact electroluminescence defect detection system 400 provided by the embodiment of this disclosure. For clarity, only the parts relevant to this embodiment are shown. The non-contact electroluminescence defect detection system 400 provided by the embodiment of this disclosure includes modules 401-406.

Image acquisition module 401, irradiating a moving solar cell with a laser to obtain an irradiation area, and simultaneously acquiring a center photoluminescence image, and a left electroluminescence image and a right electroluminescence image based on the irradiation area.

Boundary analysis module 402, performing a fusion processing on the center photoluminescence image, the left electroluminescence image, and the right electroluminescence image to identify overlapping boundary regions, and conducting a shape analysis on the overlapping boundary regions to determine a boundary distortion, and locating initial defect position coordinates based on the boundary distortion.

Position correction module 403, measuring a left diffusion distance and a right diffusion distance based on the left electroluminescence image, and the right electroluminescence image, generating a diffusion asymmetry degree based on the left diffusion distance and the right diffusion distance, and determining a defect shift direction based on the asymmetry degree, and correcting the initial defect position coordinates based on the defect shift direction to generate accurate defect position coordinates.

Gradient analysis module 404, extracting a center luminescence intensity from the center photoluminescence image, and extracting an edge luminescence intensity from the left electroluminescence image, and the right electroluminescence image, and forming a luminescence gradient curve based on the center luminescence intensity and the edge luminescence intensity, and identifying intensity jumping points through the luminescence gradient curve.

Energy identification module 405, adopting the intensity jumping points as dividing points to segment a luminescence response interval, establishing an energy distribution index based on the luminescence response interval, identifying energy conversion defects at the accurate defect position coordinates based on the energy distribution index.

Defect detection module 406, conducting a conduction path analysis based on the accurate defect position coordinates and the energy conversion defects to determine a defect coupling coefficient; identifying defect types based on the defect coupling coefficient, and outputting a spatial positioning map based on the defect types, completing the non-contact electroluminescence defect detection.

The non-contact electroluminescence defect detection system 400 described above can implement the non-contact electroluminescence defect detection method in the non-contact electroluminescence defect detection method embodiment above.

The non-contact electroluminescence defect detection method is processed by a non-contact electroluminescence defect detection equipment. The non-contact electroluminescence defect detection device refers to a network connection device that can achieve network connection. The non-contact electroluminescence defect detection device can be a server, cloud platform, etc.

Figure 13:
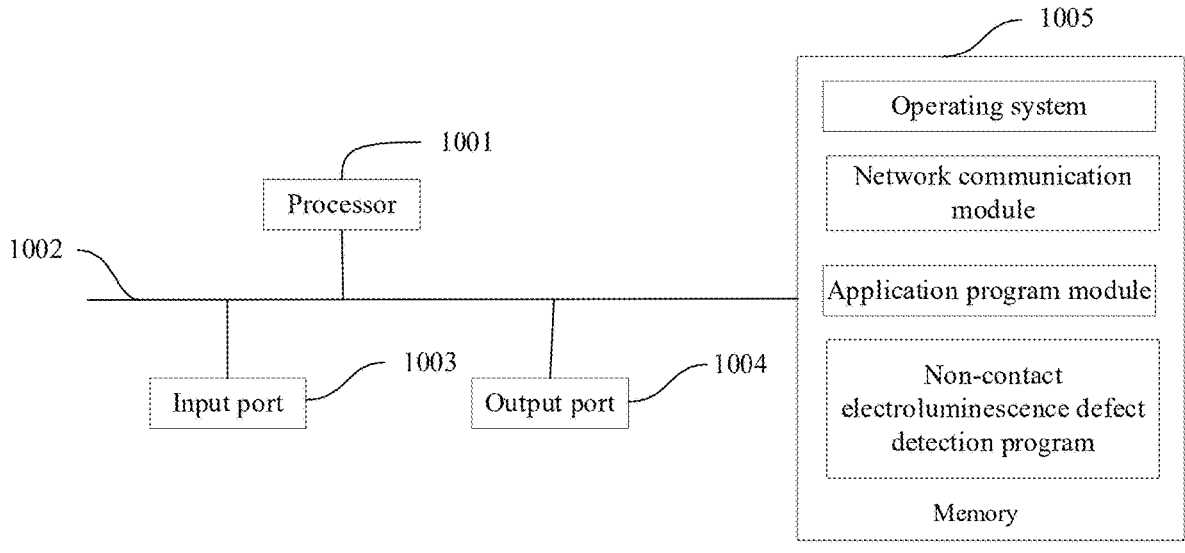
FIG. 13 is a schematic diagram of the hardware structure of a non-contact electroluminescence defect detection equipment.

As shown in FIG. 13, the non-contact electroluminescence defect detection equipment includes: a processor 1001 (such as central processing unit, CPU), a communication bus 1002, an input port 1003, an output port 1004, and a memory 1005. Among them, the communication bus 1002 is used to achieve connection communication between these components; the input port 1003 is used for data input; and the output port 1004 is used for data output, and the memory 1005 can be high-speed RAM memory or non volatile memory, such as disk memory, non-transitory computer-readable storage medium. Optionally, memory 1005 is a storage device independent of the aforementioned processor 1001.

The memory 1005, as a non-volatile readable storage medium, may include an operating system, network communication module, application program module, non-contact electroluminescence defect detection program. The network communication module is mainly used to connect to servers and communicate data with them; And processor 1001 is used to call the non-contact electroluminescence defect detection program to process the non-contact electroluminescence defect detection method stored in memory 1005, and execute all steps of the non-contact electroluminescence defect detection equipment mentioned above.

The optional elements in The non-contact electroluminescence defect detection method embodiment also apply to this embodiment and will not be elaborated here. The rest of the content of this embodiment can refer to the content of The non-contact electroluminescence defect detection method embodiment described above, and will not be repeated in this embodiment.

The purpose of the above embodiments is to provide an exemplary reproduction and derivation of the technical solution of the present disclosure, and to fully describe the technical solution, objectives, and effects of the disclosure. The goal is to provide a clearer and more comprehensive understanding of the public about the content disclosed by the disclosure, and it does not limit the protection scope of the disclosure.

What is claimed is:

1. A non-contact electroluminescence defect detection method, comprising:

irradiating a moving solar cell with a laser to obtain an irradiation area, and simultaneously acquiring a center photoluminescence image, and a left electroluminescence image and a right electroluminescence image based on the irradiation area;

performing a fusion processing on the center photoluminescence image, the left electroluminescence image, and the right electroluminescence image to identify overlapping boundary regions, and conducting a shape analysis on the overlapping boundary regions to determine a boundary distortion, and locating initial defect position coordinates based on the boundary distortion;

measuring a left diffusion distance and a right diffusion distance based on the left electroluminescence image, and the right electroluminescence image, generating a diffusion asymmetry degree based on the left diffusion distance and the right diffusion distance, and determining a defect shift direction based on the asymmetry degree, and correcting the initial defect position coordinates based on the defect shift direction to generate accurate defect position coordinates;

extracting a center luminescence intensity from the center photoluminescence image, and extracting an edge luminescence intensity from the left electroluminescence image, and the right electroluminescence image, and forming a luminescence gradient curve based on the center luminescence intensity and the edge luminescence intensity, and identifying intensity jumping points through the luminescence gradient curve;

adopting the intensity jumping points as dividing points to segment a luminescence response interval, establishing an energy distribution index based on the luminescence response interval, identifying energy conversion defects at the accurate defect position coordinates based on the energy distribution index;

conducting a conduction path analysis based on the accurate defect position coordinates and the energy conversion defects to determine a defect coupling coefficient; identifying defect types based on the defect coupling coefficient, and outputting a spatial positioning map based on the defect types, completing the non-contact electroluminescence defect detection.

2. The non-contact electroluminescence defect detection method according to claim 1, wherein acquiring center photoluminescence image and left electroluminescence image, and the right electroluminescence image based on the irradiation area comprises:

establishing a light signal timestamp mapping relationship within the irradiation area;

collecting complementary signals of center photoluminescence single, left electroluminescence signal, and right electroluminescence signal based on the timestamp mapping relationship to generate complementary signal pairs;

performing spatiotemporal cross validation on the complementary signal pairs to form a verification matrix;

forming the center photoluminescence image based on the verification matrix, and the left electroluminescence image, and the right electroluminescence image.

3. The non-contact electroluminescence defect detection method according claim 1, wherein performing a fusion processing on the center photoluminescence image, the left electroluminescence image, and the right electroluminescence image to identify overlapping boundary regions comprises:

extracting boundary cross-section shapes from the center photoluminescence image, the left electroluminescence image, and the right electroluminescence image;

performing a multi-angle projection analysis based on the boundary cross-section shapes to generate projection contour sets;

performing a cross-overlay processing on the projection contour sets to form an overlay map;

identifying boundary overlap regions based on the overlay map.

4. The non-contact electroluminescence defect detection method according to claim 1, wherein generating a diffusion asymmetry degree based on the left diffusion distance and the right diffusion distance comprises:

forming diffusion trajectories based on the left diffusion distance and the right diffusion distance;

identifying diffusion acceleration segments and diffusion deceleration segments from the diffusion trajectories;

conducting a duration comparison analysis on the diffusion acceleration segments and the diffusion deceleration segments to generate a duration difference value;

generating the diffusion asymmetry degree based on the duration difference value.

5. The non-contact electroluminescence defect detection method according to claim 1, wherein forming a luminescence gradient curve based on the center luminescence intensity and the edge luminescence intensity comprises:

establishing an intensity difference sequence based on the center luminescence intensity and the edge luminescence intensity;

performing a gradient stratification on the intensity difference sequence to generate steep gradient layers, gradual gradient layers, and gentle gradient layers;

extracting mutation features from the steep gradient layers, and extracting transition features from the gradual gradient layers, and extracting steady-state features from the gentle gradient layers;

modulating and reconstructing the mutation features, the transition features, and the steady-state features to generate the luminescence gradient curve.

6. The non-contact electroluminescence defect detection method according to claim 1, wherein establishing an energy distribution index based on the luminescence response interval comprises:

identifying energy-dense segments and energy-sparse segments within the luminescence response interval;

calculating concentration indices based on the energy-dense segments, and calculating dispersion indices based on the energy-sparse segments;

performing an energy balance evaluation based on the concentration indices and the dispersion indices to generate balance parameters;

generating the energy distribution index based on the balance parameters.

7. The non-contact electroluminescence defect detection method according to claim 1, wherein conducting a conduction path analysis based on the accurate defect position coordinates and the energy conversion defects to determine a defect coupling coefficient comprises:

establishing defect impact boundaries based on the accurate defect position coordinates;

tracking a conduction path of the energy conversion defects within the defect influence boundaries, to identify a conduction enhancement path and a conduction attenuation path;

determining the defect coupling coefficient based on a length ratio of the conduction enhancement path and the conduction attenuation path.

8. The non-contact electroluminescence defect detection method according to claim 3, wherein performing a multi-angle projection analysis based on the boundary cross-section shapes to generate a projection contour sets comprises:

evaluating a projection complexity of the boundary cross-section shapes to determine a projection strategy, the projection complexity comprises a boundary curvature, a defect distribution density, and a boundary continuity;

setting a multi-angle projection scanning sequence based on the projection strategy;

performing a profile extraction for each of angles in the multi-angle projection scanning sequence to generate a projection contour sets.

9. The non-contact electroluminescence defect detection method according to claim 5, wherein modulating and reconstructing the mutation features, the transition features, and the steady-state features to generate the luminescence gradient curve comprises:

conducting polarity identification on the mutation features, the transition features, and the steady-state features to generate a positive polarity feature group and a negative polarity feature group;

neutralizing the negative polarity feature group based on the positive polarity feature group to form balanced features;

modulating and encoding the balanced features to generate a feature modulation signal;

demodulating and reconstructing the feature modulation signal to generate the luminescence gradient curve.

\* \* \* \* \*